US009538561B2

(12) United States Patent
Qi et al.

(10) Patent No.: US 9,538,561 B2
(45) Date of Patent: Jan. 3, 2017

(54) SYSTEMS AND METHODS FOR ENABLING SERVICE INTEROPERABILITY FUNCTIONALITY FOR WIFI DIRECT DEVICES CONNECTED TO A NETWORK VIA A WIRELESS ACCESS POINT

(71) Applicants: Emily H. Qi, Portland, OR (US); Carlos Cordeiro, Portland, OR (US); Ganesh Venkatesan, Hillsboro, OR (US); Bahareh Sadeghi, Portland, OR (US)

(72) Inventors: Emily H. Qi, Portland, OR (US); Carlos Cordeiro, Portland, OR (US); Ganesh Venkatesan, Hillsboro, OR (US); Bahareh Sadeghi, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 272 days.

(21) Appl. No.: 14/035,276

(22) Filed: Sep. 24, 2013

(65) Prior Publication Data
US 2014/0351444 A1 Nov. 27, 2014

Related U.S. Application Data

(60) Provisional application No. 61/826,109, filed on May 22, 2013.

(51) Int. Cl.
*H04W 76/02* (2009.01)
*H04L 29/08* (2006.01)

(52) U.S. Cl.
CPC ............ *H04W 76/021* (2013.01); *H04L 67/16* (2013.01)

(58) Field of Classification Search
CPC ...... H04W 76/021; H04W 8/005; H04L 67/16
See application file for complete search history.

(56) References Cited

U.S. PATENT DOCUMENTS

| | | | |
|---|---|---|---|
| 2011/0103264 A1* | 5/2011 | Wentink | 370/255 |
| 2012/0250576 A1* | 10/2012 | Rajamani et al. | 370/254 |
| 2013/0148643 A1* | 6/2013 | Abraham et al. | 370/338 |
| 2013/0227152 A1* | 8/2013 | Lee | H04W 48/16 709/227 |
| 2013/0229944 A1* | 9/2013 | Montemurro et al. | 370/254 |

* cited by examiner

*Primary Examiner* — Chris Parry
*Assistant Examiner* — Daeoo Lee
(74) *Attorney, Agent, or Firm* — Sutherland Asbill & Brennan LLP

(57) ABSTRACT

Certain embodiments herein are directed to enabling service interoperability functionality for wireless fidelity (WiFi) Direct devices connected to a network via a wireless access point. A WiFi Direct device may identify various other WiFi Direct devices on a WiFi network for performing a requested service, such as printing content or displaying content to a screen. In so doing, the device may share information associated with an access point to which the device is connected with the other devices, which may also share information associated with an access point to which they are connected. In this way, WiFi Direct devices may discover their connectivity with respect to other devices to utilize a broader array of connection options for implementing a desired service, and hence, may leverage application programming interface (API) modules directed at providing service interoperability functionality between software applications and services requested by the software applications.

18 Claims, 7 Drawing Sheets

SYSTEMS AND METHODS FOR ENABLING SERVICE INTEROPERABILITY FUNCTIONALITY FOR WIFI DIRECT DEVICES CONNECTED TO A NETWORK VIA A WIRELESS ACCESS POINT

RELATED APPLICATIONS

The present application is a non-provisional application claiming priority to U.S. Provisional Application No. 61/826,109, entitled "Techniques to Extend ASP Connection Management," filed on May 22, 2013, which is hereby incorporated by reference in its entirety as if fully set forth herein.

BACKGROUND

The WiFi Direct communications protocol enables wireless devices to communicate directly with one another to exchange content or information, among other uses. The WiFi Direct protocol struggles, however, to provide interoperability between software applications and services to ensure a consistent, reliable exchange of content or information between devices. To address this problem, standards bodies are currently developing program modes and protocols to improve service interoperability for WiFi Direct enabled devices. Such program modules and protocols, and hence service interoperability, however, is limited to devices that communicate directly with one another using the peer-to-peer protocol. No such interoperability exists for WiFi Direct devices that utilize wireless access points to communicate with each other in part because the devices do not have knowledge of each other's connection capabilities.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
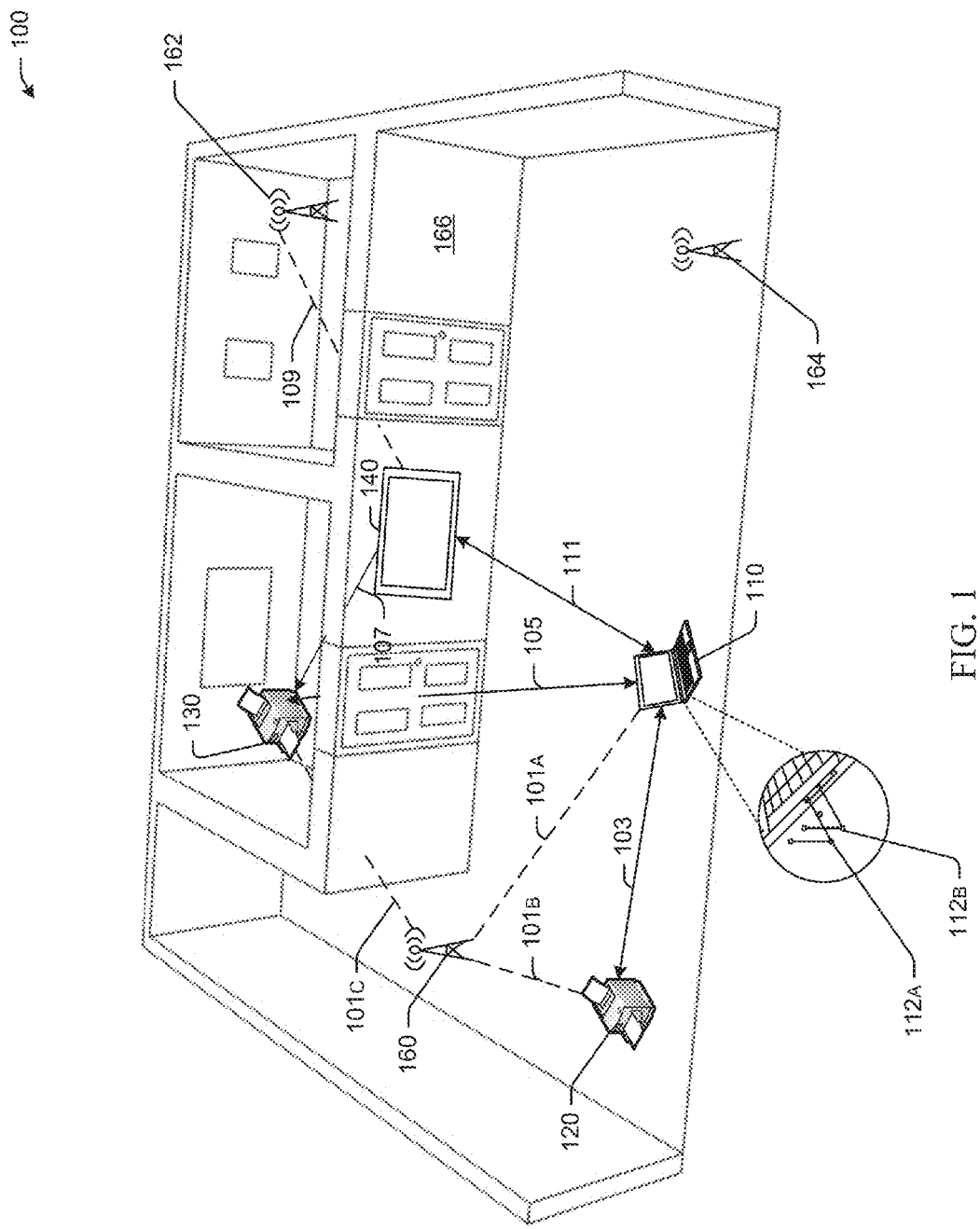
FIG. 1 illustrates an example environment in which various WiFi Direct devices that are connected to a wireless access point may communicate with one another using various types of communication, according to an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein are directed to, among other things, enabling service interoperability functionality for wireless fidelity (WiFi) Direct devices connected to a network via a wireless access point. A WiFi Direct device may identify various other WiFi Direct devices on a WiFi network for performing a requested service, such as printing content or displaying content to a screen. In so doing, the device may share information associated with an access point to which the device is connected with the other devices, which may also share information associated with an access point to which they are connected. In this way, WiFi Direct devices may discover their connectivity with respect to other devices to utilize a broader array of connection options for implementing a desired service. Effective use of the desired service may depend on application programming interface (API) modules that provide service interoperability functionality between the desired service and an application associated with the device that may request the service. As used herein, such service interoperability functionality may enable a more consistent, reliable exchange of information between a software application or program module requesting a service and the service itself. Such functionality may be referred to herein generally as application service program (ASP) connection management. The software application or program module involved in the ASP connection may be associated with a requester device (or a device requesting performance of a service), and the service may be associated with a service device (or a device that performs the service), as used herein.

By leveraging connectivity information, WiFi Direct devices may discover that they are connected to the same access point, and therefore, may communicate with one another via the shared access point rather than refusing a direct, peer-to-peer connection which may be unavailable to devices already connected to a network via a wireless access point. In this way, service interoperability functionality as described above may be leveraged by WiFi Direct devices connected to the same wireless access point.

A requester device that has determined that it shares the same access point with a service device may send subsequent information requests to the service device via the shared access point or via a Tunneled Direct Link Setup (TDLS). For example, a request for particular information associated with a requested service may be sent via one of such connections. In certain embodiments, as described further herein, a requester device may also communicate with a service device via the peer-to-peer protocol in the absence of information that the requester device is connected to the same wireless access point as the service device. A service device may, upon receiving a request to perform a service, determine a particular type of connection to be used for exchanging information associated with the service to the requester device. Such a determination may be based on connection capabilities of the requester device and the service device, performance indicators of the connection capabilities, etc.

The above descriptions are for purposes of illustration and are not meant to be limiting. Numerous other descriptions, configurations, examples, etc., may also exist, some of which are described in detail below.

FIG. 1 depicts an example environment 100 in which various WiFi Direct devices that are connected to a wireless access point may communicate with one another using various types of communication, according to an embodiment of the disclosure. As shown in FIG. 1, a requester device 110, printer devices 120 and 130, and a display device 140 may communicate with each another. The devices 110, 120, 130, 140 may communicate directly with each other and/or via at least one of the wireless access points 152, 154, and 156, according to various embodiments herein. As used herein, a requester device may refer generally to a WiFi Direct device that requests a service from a client-type device, such as a printer device 120, display device 140, or other service or output device. A service device, as used herein, may refer to a client-type or output device that performs a particular service, such as printing content (e.g., the printer devices 120 and 130), outputting content to a display (e.g., the display device 140), or various other services.

Example communications to facilitate enabling service interoperability functionality as described herein may be as follows. In one example, the requester device 110 may send a probe request to discover or identify devices that are within range on a wireless network. The probe request may be sent using the peer-to-peer or WiFi Direct protocol, in one embodiment. The probe request may include various information such as, but not limited to, information identifying an access point to which the requester device 110 is connected. In the present example, the requester device 110 can be connected to the access point 160, as indicated by dotted line 101a. One device that may receive the probe request may be the printer device 120. Upon receiving the probe request, the printer device 120 may become aware that the requester device 110 is connected to the access point 160. The printer device 120 may have been unaware of such information prior to receiving the probe request. The other printer device 130 and the display device 140 may also receive the probe request, as indicated by lines 105 and 111, respectively.

Devices that receive a probe request may send a response to the probe request, referred to herein as a probe response. Probe responses may also include various information such as, but not limited to, information associated with an access point to which a service device that received the probe request is connected. For example, the printer device 120 may send a probe response to the requester device 110 that indicates that the printer device 120 is also connected to the access point 160, as indicated by dotted line 101b. Upon the requester device 110 becoming aware that the printer device 120 is also connected to the access point 160, communication between the requester device 110 and the printer device 120 may occur via the access point infrastructure 160. The requester device 110 and the printer device 120 may also communicate directly with one another using Tunneled Direct Link Setup (TDLS) since both devices are connected to a WiFi network via the access point 160. According to one example, the requester device 110 may send a service discovery request, a request to perform a service, etc., to the printer device 120 via the access point 160 or TDLS to receive information associated with a print request. Prior to discovering that the printer device 120 is connected to the same access point 160, the requester device 110 may have attempted to establish direct communication with the printer device 120, consistent with the WiFi Direct protocol.

In an example embodiment, the printer device 120 may be equipped with a single wireless interface, and therefore, may be able to communicate via either the wireless access point 160 or via direct communication other devices, but not both. According to this example embodiment, the printer device 120 may not establish a peer-to-peer connection with the requester device 110 but may establish a connection via the access point 160 or a TDLS link. Receiving an indication in the probe request that the requester device 110 is connected to the same access point 160 may enable the printer device 120 to establish communication via a wireless access point or TDLS link instead of refusing connection requests from devices that request peer-to-peer communication but also have capability to connect via a wireless access point, according to one embodiment. In this way, devices that are connected to a wireless access point may leverage service interoperability functionality as described herein between themselves, whereas such functionality may have otherwise been available only to devices that are directly connected to one another.

Another example communication in accordance with an embodiment may be as follows. The requester device 110 and the printer device 130 may also exchange information associated with their connectivity, as described above. In one embodiment, the printer device 130 may include two wireless interfaces that may, for example, allow it to communicate via a wireless access point and via direct communication. According to one example, the printer device 130 may be currently communicating directly with the display device 140 via the peer-to-peer protocol using one wireless interface, and may connect to the requester device 110 via the access point 160 infrastructure using the second wireless interface since the two devices are connected to the same access point 160, as indicated in the probe request and the probe response described above.

As another example, the requester device 110 and the display device 140 may also exchange information associated with their connectivity, as described above. In the present example, the display device 140 may be connected to the access point 162 (as shown by line 109), which is different from the access point 160 to which the requester device 110 is connected. Because the two access points are different, the requester device 110 and the display device 140 may not establish connectivity using a wireless access point. According to this example, the requester device 110 may establish a peer-to-peer connection with the display device 140. The computing device 110 may include two wireless interfaces, which for purposes of illustration only are represented by antennas 112a and 112b, to facilitate communications with a printer device (e.g., the printer device 120 or 130) and the display device 140.

The above examples in FIG. 1 are for purposes of illustration and are not meant to be limiting. For example, a different number of devices, wireless interfaces, and access points may exist. Also, different types or protocols of communication may exist in other examples. Further, services other than printing and displaying content may also be implemented. Any service configured to receive and/or send communications between WiFi Direct devices may exist in other examples.

As used herein, the term "device" may refer to any computing component that includes one or more processors that can be configured to execute computer-readable, computer-implemented, or computer-executable instructions. Example devices can include client-type devices, output-type devices, wearable devices, personal computers, server computers, server farms, digital assistants, smart phones, personal digital assistants, digital tablets, smart cards, Internet appliances, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate authentication of access to an operating system by a user using before the operating system is booted using a wireless communication token.

As used herein, the term "service" may refer to a set of related software functionalities that may be reused for various purposes, together with policies that control its usage.

The requester device 110 may also include a radio receiver (not shown). A physical layer interface in the radio receiver may include a radio frequency (RF) unit that may be configured to provide for reception of one or more RF signals at one or more frequencies. According to one configuration, the RF unit may include an amplifier, a mixer, a local oscillator, and so forth. The RF unit may be implemented as discrete electronic components, integrated circuits, software-defined radio, or a combination thereof, according to various configurations. The requester device 110 may further include a radio transmitter that may send one or more RF signals to one or more access points, such as access points 160, 162, and 164, as an example. In some configurations, the requester device 110 may include a radio transceiver that may receive and send RF signals. A transceiver (or the receiver and/or the transmitter) may be coupled to one or more antennas (e.g. antennas associated with the requester device 110. In one embodiment a single wireless interface may include multiple antennas that may be used to reduce the effects of multipath fading on received signals, for example, when signals sent from between devices are deflected off of one or more walls 166 in the environment 100.

Figure 2:
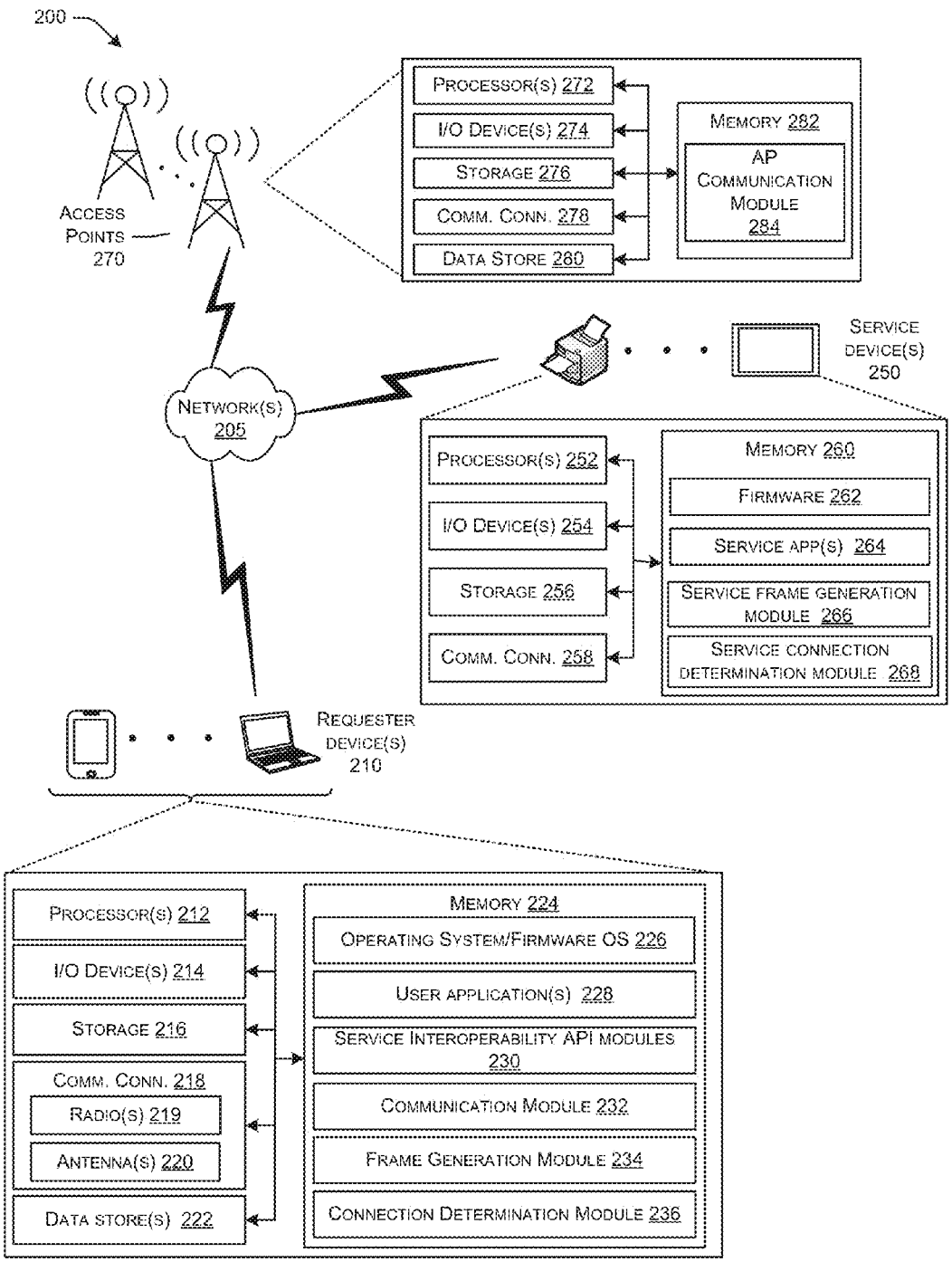
FIG. 2 illustrates a block diagram of an example computing environment for enabling service interoperability functionality for WiFi Direct devices connected to a network via a wireless access point, according to an embodiment of the disclosure.

Turning to FIG. 2, FIG. 2 depicts a block diagram of an example computing environment 200 for enabling service interoperability functionality for WiFi Direct devices connected to a network via a wireless access point. The one or more networks 205 may facilitate communication between certain devices 210, 250, 270, which are similar to the devices 110, 120, 130, 140, 160, 162, 164 shown in FIG. 1. Such networks 205 may include any number of wired or wireless networks that can enable various computing devices in the example computing environment 100 to communicate with one another. In some embodiments, other networks, intranets, or combinations of different types of networks may be used including, but not limited to, wireless fidelity (WiFi) networks, WiFi Direct networks, NFC networks, Bluetooth® networks, the Internet, intranets, cable networks, cellular networks, landline-based networks, radio networks, satellite networks, other short-range, mid-range, or long-range wireless networks, or other communication mediums connecting multiple computing devices to one another.

The computing environment 200 shown in FIG. 2 may include, but is not limited to, one or more requester devices 210, one or more service devices 250, and one or more access points 270. The requester device 210 and the service devices 250 may send data frames between one another using various types of communication, such as peer-to-peer, via an access point, or via a TDLS link, as described above. As used herein, a frame may refer to a data unit that encapsulates one or more packets, which may include payloads or data, for transmission across a network, such as the WiFi, WiFi Direct, etc.

In some embodiments, various modulation techniques may be used for modulating signals that may include information in frames distributed over the one or more networks 205, such as Orthogonal Frequency Division Multiplexing (OFDM), dense wave division multiplexing (DWDM), phase-shift keying (PSK), frequency-shift keying (FSK), amplitude-shift keying (ASK), and quadrature amplitude modulation (QAM), among other techniques. Each of the devices shown in FIG. 2 may utilize such modulation techniques, as well as demodulation techniques, to access information from a modulated signal.

The devices 210, 250, and access points 270 in FIG. 2 may include one or more processors configured to communicate with one or more memory devices and various other components or devices. For example, the requester devices 210 may include one or more processors 212, one or more input/output (I/O) devices 214, storage 216, one or more communication connections 218, and one or more data stores 222. The one or more processors 212 may be implemented as appropriate in hardware, software, firmware, or a combination thereof. With respect to the service devices 250 and the access points 270, the one or more respective processors 252, 272 may be the same or at least similar to the processor 212 associated with the requester devices 210.

The memory 224 associated with the requester devices 210 may store program instructions that are loadable and executable on the associated processor 212, as well as data generated during the execution of these programs. Depending on the configuration and type of the requester device 210, the memory 224 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc. With respect to the service devices 250 and the access points 270, the respective memories 260, 282 may be the same or at least similar to the memory 224 associated with the requester devices 210.

The storage 216 associated with the requester devices 210 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. With respect to the service devices 250 and the access points 270, the respective storage 256 and 276 may be the same or at least similar to the storage 216 associated with the requester devices 210.

In any instance, the memory 224, 260, 282, and the storage 216, 256, 276, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The I/O devices 214 associated with the requester devices 210 may enable a user to interact with the requester device 210 to, among other things, select a device for performing a particular service, one or more parameters associated with the service, etc. The I/O devices 214 may include, but are not limited to, a keyboard, a mouse, a pen, a voice input device, a touch input device, a gesture detection or capture device, a display, a camera or an imaging device, speakers, and/or a printer. With respect to the service devices 250 and the access points 270, the respective I/O devices 254 and 274 may be the same or at least similar to the I/O devices 214 associated with the requester devices 210.

The one or more communication connections 218 associated with the requester devices 210 may allow the requester device 210 to communicate with other devices, such as the service devices 250 and the access points 270 via the one or more wireless and/or wired networks 205. In one embodiment, the communication connections 218 may include one or more antennas 220 and one or more radios 219, which may include hardware and software for sending and/or receiving wireless signals over the various types of networks 205 described above. With respect to the service devices 250 and the access points 270, the respective communication connections 258 and 278 may be the same or at least similar to the communication connections 218 associated with the requester devices 210. For example, the communication connections 258 may include one or more radios and antennas that may enable the service device 250 to receive and/or send wireless signals to the requester device 210 or to the access point 270, which may route the wireless signals originating from the service device 250 to the requester device 210.

The one or more data stores 222 associated with the requester devices 210 may store lists, arrays, databases, flat files, etc. In some implementations, the data stores 222 may be stored in a memory external to the requester device 210 but may be accessible via one or more networks, such as with a cloud storage service. The data stores 222 may store information that may facilitate enabling service interoperability functionality for WiFi Direct devices connected to a network via an access point infrastructure as described herein. Such information may include, but is not limited to, information associated with an access point 270 to which the requester device 210 is connected, such as a Media Access Control (MAC) address, or a corresponding basic service set identification (BSSID) or service set identifier (SSID), a flag corresponding to a bit value indicating a current connection state of a WiFi Direct device with respect to an access point, an operating class indicating a frequency band at which the access point is currently operating, an indication of a channel number on which the access point is currently operating, a country code in which the operating class and channel number fields are valid, a time offset indicating when a WiFi Direct device connected to the access point will be available on the concurrent operating channel, etc.; information that may be used to generate frames for transmitting packets including data across a network, such as frame size, delimiters, etc.; and various other information that may facilitate the processes described herein.

Turning to the contents of the memory 224 associated with the requester devices 210, the memory 224 may include, but is not limited to, an operating system 226, one or more user applications 228, one or more service interoperability application programming interface (API) modules 230, and various program modules to implement, facilitate, or otherwise provide certain processes described herein, such as a communication module 232, a frame generation module 234, and a connection determination module 236. Each of these modules 230, 232, 234, 236 may be implemented as individual modules that provide specific functionality associated with enabling service interoperability functionality for WiFi Direct devices connected to a network via a wireless access point infrastructure. Alternatively, one or more of the modules 230, 232, 234, 236 may perform all or at least some of the functionality associated with the other modules.

The operating system 226 associated with the memory 224 may refer to a collection of software that manages computer hardware resources and provides common services for computer programs to enable and facilitate operation of such programs. Example operating systems may include UNIX, Microsoft Windows, Apple OS X, etc.

The one or user applications 228 associated with the memory 224 may perform any number of functions, including enabling a user to view and/or interact with content (e.g., text, data, video, multimedia, or other information). Example user applications 228 may enable the user to utilize various services, such as printing content or sharing the content with a display device (e.g., the display device 140 in FIG. 1), and may include one or more device drivers to facilitate such functions.

The service interoperability API modules 230 associated with the memory 224 may include a common set of APIs and protocols directed to enabling service interoperability between the user applications 228 and various services (e.g., printing, displaying and/or interacting with content on a display device, etc.). In one embodiment, at least a portion of the service interoperability API modules 230 may include modules developed by the WiFi Alliance to provide such service interoperability. The specifications describing the service interoperability may be defined in the WiFi Direct Service (WFDS) specification. In one embodiment, the service interoperability API modules 230 may be invoked by a software application or other program module such that the functionality provided by the service interoperability API modules 230 may be utilized, including enabling communication between a software application that requests a service and the requested service.

The communication module 232 associated with the memory 224 may enable the requester device 210 to communicate with the service devices 250 and the access points 270. For example, the communication module 232 may send a probe request to the service device 250 using the peer-to-peer protocol and may receive a probe response from the service device 250. The probe request may include information associated with an access point 270 to which the requester device 210 is connected, among other information. The probe response may include information associated with an access point 270 to which the service device 250 is connected, among other information.

The communication module 232 may also send a request for information associated with one or more services (referred to herein as a discovery request) and receive a response to the request that includes information associated with the requested service (referred to herein as a discovery response). The discovery request and the discovery response may be sent using either a layer 2 or layer 3 protocol, depending on the network connectivity of the requester device 210 and the service device 250, as will be described in greater detail below.

The communication module 232 may further send connection capabilities of the requester device 210 and a request for session information (referred to herein as a session request frame), among other information, to the service device 250. The communication module 232 may also receive a response to the request (referred to herein as a session response frame). In one example, the session request frame may include a file to be printed by a service device 250, such as a printer device.

The frames sent and received by the communication module 232 may be Ethernet frames, User Datagram Protocol (UDP) frames, or other types of frames. Examples describing the above types of requests and responses will be described in greater detail below.

The frame generation module 234 associated with the memory 224 may generate frames for distribution by the communication module 232. In so doing, the frame generation module 234 may perform various functions. One such function may include determining information that may be included in a frame. Such information may be accessed in the data store 222 or other storage mechanism. Another function may include adding attributes to the frame for distribution over the one or more networks 205. An example attribute may include information associated with an access point to which the requester device 210 is connection (e.g., the access point 270). Another attribute may include an indication of a protocol used to distribute a frame. In one example, the frame generation module 234 may indicate a layer 3 protocol such as, but not limited to, Bonjour or Universal Plug and Play (UPnP). Bonjour and UPnP may refer generally to a set of networking protocols that permits networked devise to discover each other's presence on a network and establish functional network services for data sharing, communications, and/or other functions. The communication module 232 may invoke such a protocol to distribute the frame upon reading the indication, in one embodiment. A layer 3 protocol may be utilized when the requester device 210 and the service device 250 share the same access point 270, in one embodiment. As another example, the frame generation module 234 may indicate a layer 2 protocol, which may also be invoked by the communication module 232 to distribute a frame directly to another device. An example layer 2 protocol may include, but is not limited to, peer-to-peer.

The connection determination module 236 associated with the memory 224 may determine a type of communication for sending information from the requester device 210, such as via an access point 270 or peer-to-peer, as non-limiting examples. In one embodiment, such a determination may be made by comparing information associated with an access point to which the requester device 210 is connected to information associated with an access point to which the service device 250 is connected, as may be identified in a probe response. If at least a portion of the information matches, such as the BSSID or MAC address of the access points, then one or more access points 270 may be used for communication. The one or more access points 270 may forward or route information between the requester device 210 and the service device 250. A TDLS link may also be established in such instances in which a requester device 210 and a service device 250 connected to a WiFi network via an access point (e.g., the same access point 270) may establish a direct communication link with one another. If the access point information does not match, then the peer-to-peer protocol may be used to communicate information between the requester device 210 and the service device 250, in one embodiment.

Turning to the contents of the memory 260 associated with the service devices 250, the memory 260 may include, but is not limited to, firmware 262, one or more service applications 264, a service frame generation module 266, and a service connection determination module 268. Each of these modules 266, 268 may be implemented as individual modules that provide specific functionality associated with enabling service interoperability functionality for WiFi Direct devices connected to a network via a wireless access point infrastructure. Alternatively, one or more of the modules 266, 268 may perform all or at least some of the functionality associated with the other modules.

The firmware 262 associated with memory 260 may include program code and data stored in a persistent memory (e.g., ROM, flash memory, etc.) for controlling the operation of the service device 250. In one embodiment, the firmware 262 may provide various services for the service device 250. For example, a firmware 262 associated with a printer device may control the receipt and printing of content, among other functions. As another example, a firmware 262 associated with a display device may display received content to a screen where it may be viewed by a user. Such functionality may also be provided by one or more software applications, which may be loaded in RAM or other volatile memory.

The one or more service applications 264 associated with memory 260 may perform any number of functions to implement or facilitate one or more services provided by the service device 250. In one embodiment, such services may include displaying options to a user, receiving selections of such options, reconfiguring the service device 250 to perform functions according to the selected options, subsequently performing at least a portion of the functions, etc.

The service frame generation module 264 associated with memory 260 may generate frames for distribution to the devices 210, 250 in FIG. 2 over the one or more networks 205. In one embodiment, the service frame generation module 264 may perform functionality that is the same or at least similar to the frame generation module 234 associated with the requester devices 210. For example, the service frame generation module 264 may identify information associated with an access point 270 to which the service device 250 is connected, the name or other identification associated with services provided by the service device 250, configuration parameters, options, other details, etc. A more detailed description of such information will be provided below.

The service connection determination module 268 associated with memory 260 may determine a type of connection for facilitating the requested service for the requester device 210. In one embodiment, the service connection determination module 268 may determine the type of connection by comparing connection capabilities received from a requester device 210 to connection capabilities associated with the service device 250. Additional information may also be considered, such as the type of service requested and network performance indicators, such as latency of the connection, throughput, quality of the connection, etc.

The service device 250 may also have a communication module (not shown) that may send and/or receive information from various devices in FIG. 2.

The access points 270 may include various software and/or program modules to facilitate the processes described herein. For example, the access point 270 may include an AP (access point) communication module 284 that may configure the access point to send and/or receive information from the devices shown in FIG. 1. The access points 270 may route the information between such devices to facilitate one or more of the processes described herein.

The above descriptions in association with FIG. 2 are for purposes of illustration and are not meant to be limiting. Various other embodiments, configurations, examples, etc., may also exist. For example, at least a portion of the software implemented by the requester device 210 may be implemented by one or more other devices in FIG. 2.

Different or additional functionality may also exist. For example, the access point 270 may send a beacon packet to the requester device 210 that includes information identifying the access point 270. Such information may be stored and used in the generation of a probe request and other requests by the requester device 210, in some embodiments.

Figure 3:
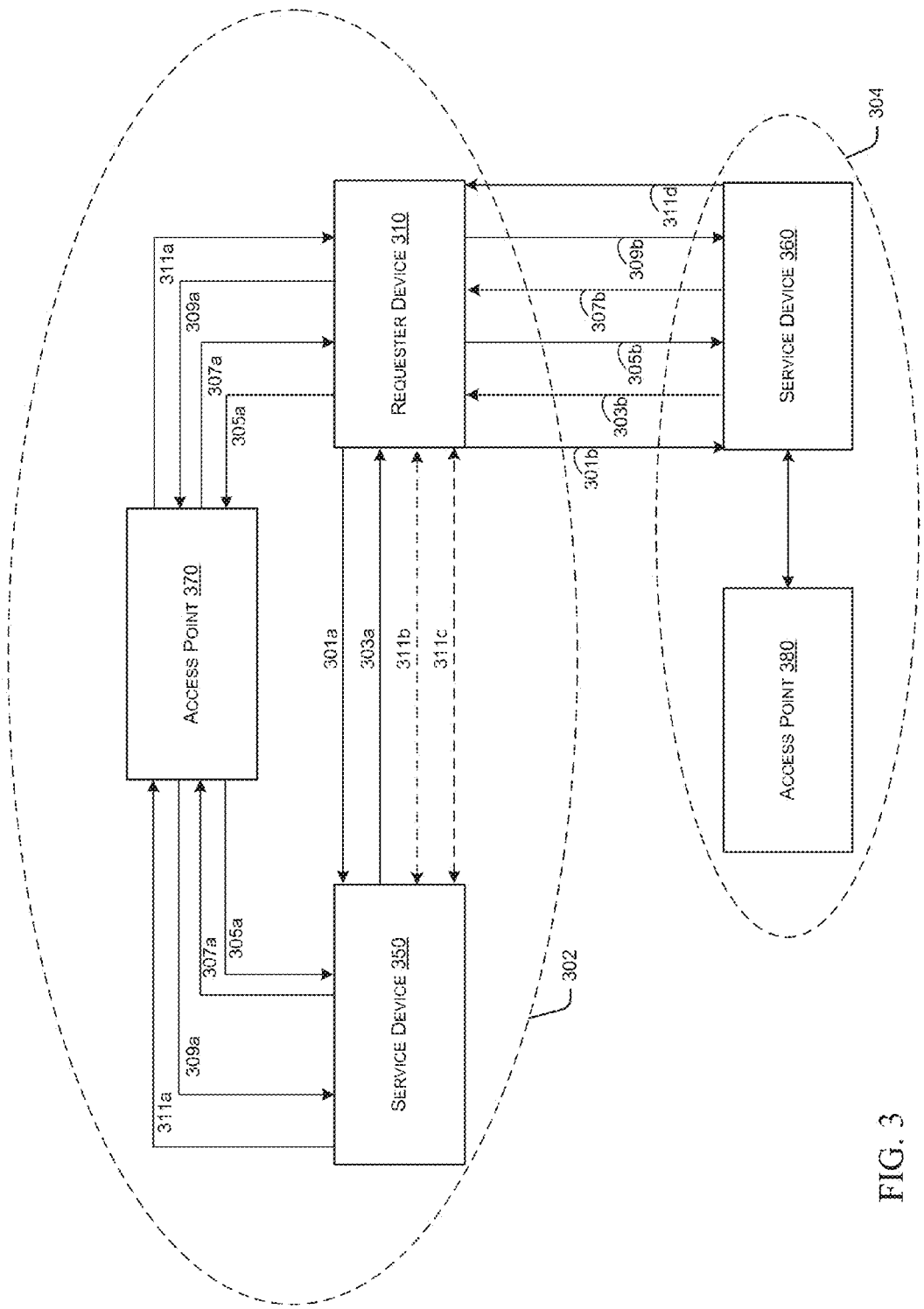
FIG. 3 illustrates a block diagram of an example process for enabling service interoperability functionality for WiFi Direct devices connected to a network via a wireless access point, according to an embodiment of the disclosure.

FIG. 3 depicts a block diagram of an example process for enabling service interoperability functionality for WiFi Direct devices connected to a network via a wireless access point, according to an embodiment of the disclosure. As shown in FIG. 3 via dotted oval 302, a requester device 310 and a service device 350 may be connected to the same access point 370. Another service device 360 may be connected to a different access point 380, as indicated by dotted oval 304. Certain embodiments herein relate to enabling the requester device 310 and the service device 350 to leverage service interoperability functionality when communicating via an access point infrastructure, for example, through the access point 370 or via a TDLS link between the requester device 310 and the service device 350. Certain embodiments herein may also determine a type of connection to establish for communication. Examples of such functionality may be as follows.

The requester device 310 may send a probe request to identify devices on a network (e.g., a WiFi network) that may provide certain services. For example, probe requests 301*a* and 301*b* may be sent to the service device 350 and the service device 360, respectively. Probe requests may also be sent to various other devices (not shown) but that may be in range of the requester device 310. In one embodiment, probe requests may be sent using the peer-to-peer protocol or various other protocols in other examples.

Each probe request may include various information, such as an identification of one or more requested services. Example services may include, but are not limited to, printing (e.g., by the printer device 120 in FIG. 1), outputting content to a display screen (e.g., by the display device 140 in FIG. 1), or any function that may be implemented by a device. The identification of services in a probe request may include a hash value corresponding to the service name, in one embodiment. A hash function that maps data of variable length (e.g., the name of the service) to data of a fixed length may be used to generate the hash value, in one embodiment.

Each probe request may also include information associated with the access point, such as 370, to which the requester device, such as 310, is connected. Example access point information provided in a probe request may include a Media Access Control (MAC) address, or a corresponding basic service set identification (BSSID) or service set identifier (SSID), a flag corresponding to a bit value indicating a current connection state of a WiFi Direct device with respect to an access point, an operating class indicating a frequency band at which the access point is currently operating, an indication of a channel number on which the access point is currently operating, a country code in which the operating class and channel number fields are valid, and a time offset indicating when a WiFi Direct device connected to the access point will be available on the concurrent operating channel.

The requester device 310 may receive a probe response in response to sending the probe request. For example, the requester device 310 may receive a probe response from the service device 350 and the service device 360, as shown in communications 303*a* and 303*b*, respectively. The probe responses 303*a* and 303*b* may be communicated via the peer-to-peer protocol, in one embodiment. The probe responses 303*a* and 303*b* may include various information, such as an identification of one or more service names. Such service names may be service names requested by the requester device 310 in the probe request. In one example, a service device (e.g., the service device 350) may determine the service name from the hash value received in the probe request. The probe responses 303*a* and 303*b* may also include an identification of the service, such as a Transmission Control Protocol/Internet Protocol (TCP/IP) address of a device providing the requested service, a port number associated with the service, etc.

The probe responses 303*a* and 303*b* may further include information associated with an access point to which the service device 350 and the service device 360, respectively, is connected. Because the service device 350 is connected to the same access point as the requester device 310 (as shown by the dotted oval 302), at least a portion of the access point information in the probe response 303*a* may match at least another portion of the access point information in the probe request 301*a*. For example, a BSSID in the probe response 303*a* may match a BSSID in the probe request 301*a*, which may indicate that the requester device 310 and the service device 350 are connected to the same access point 370. A BSSID in the probe response 303*b* received from the service device 360 may not match the BSSID in the probe request 301*b* sent from the requester device 310 because the service device 360 is connected to an access point (e.g., the access point 380 as shown by the dotted oval 304) that is different from the access point 370 to which the requester device 310 is connected.

As described, the requester device 310 may compare information associated with the access point 370 to the access point information received in the probe responses. The comparison may be used to determine a type of connection for communicating with other devices. For example, if the access point information in the probe request matches the access point information in the probe response, then the access point infrastructure or TDLS may be used to send and receive information associated with a requested service (e.g., the service indicated in the probe requests 301*a* and 301*b*). If a match does not exist, then peer-to-peer communication may be used to send and receive the information, in certain embodiments.

In the present example, a request for information associated with a service (a discovery request) may be sent from the requester device 310 to the service device 350 and the service device 360, as shown in communications 305*a* and 305*b*, respectively. The discovery requests 305*a* and 305*b* may include one or more service names, for example, of services desired by the requester device 310 and a request for information associated with the one or more services, such as device settings, configurations, device capabilities, among other information. Particular information may be requested in the service discovery requests 305*a* and 305*b*, in one embodiment. For example, in embodiments in which the service device is a printer, such information may include fonts supported by the printer, a type of the printer, printing options, etc. The information may be utilized by a user of the requester device 310 to select a particular device for providing a service, as will be described in greater detail below.

The requester device 310 may receive a response (discovery response) to service discovery requests from the service device 350 and the service device 360, as shown in communications 307*a* and 307*b*, respectively. A response may be received from any device to which a discovery request was sent, in certain embodiments. The discovery responses may include, but is not limited to, a name of the service for which information was requested; other identifications of the service, such as a TCP/IP address, a port number associated with the service, etc.; and status information associated with the requested service, such as particular information associated with the service device's settings or configurations, device capabilities, etc., as may be requested by the requester device.

In certain embodiments herein, a certain type of communication may be used for sending discovery request information. The type of communication may be based at least in part on connectivity of WiFi Direct devices, in one embodiment. For example, a layer 3 protocol of the Open Systems Interconnection (OSI) model may be used for communicating information between devices that are connected to the same access point. Example layer 3 protocols may include, but are not limited to, Bonjour and UPnP. As another example, a layer 2 protocol may be used for communicating information between devices that are not connected to the same access point. An example layer 2 protocol may include, but is not limited to, the peer-to-peer protocol. In the present example, a layer 3 protocol may be used to communicate the discovery request 305a and the discovery response 307a, whereas a layer 2 protocol may be used to communicate the discovery request 305b and the discovery response 307b. Various other types of communication may be used in other examples.

The requester device 310 may display a list of devices providing the requested service along with corresponding service information. In one embodiment, such information may be obtained from the discovery responses 307a and 307b. A user utilizing the requester device 310 may select one or more devices from the list for performing the service (e.g., via the one or more user applications 228 in FIG. 2).

For purposes of illustration, it is assumed that the user selected the service device 350 and the service device 360 for performing a print service. The requester device 310 may send the request to perform the printing service to such devices based on the connectivity of the devices, as identified in the probe request and the probe response, as described above. In one example, the requester device 310 may send a session request frame requesting performance of the print service to the service device 350 via the access point infrastructure 370, as shown in communication 309a. As described, such communication may occur because the requester device 310 and the service device 350 are connected to the same access point 370, which may have been discovered by the exchange of access point information in the probe request 301a and the probe response 303a.

As another example, the requester device 310 may send a request to perform the print service to the service device 360 using the peer-to-peer protocol, as shown in communication 309b. The peer-to-peer protocol may be used because the requester device 310 and the service device 360 are not connected to the same access point in the present example. The requester device 310 may determine not to send a request to various other devices (not shown) for performing a print service based on analysis of discovery response information received from such devices. Such devices may not, for example, provide the requested service according to parameters or configurations requested by the requester device 310, or otherwise may be unsuitable for providing the service.

The session request frames 309a and 309b may include various attributes, such as session information and connection capabilities associated with the requester device 310, among other information. The session information attribute may include information associated with performing a service. In the example in which a print service is requested, the session information may include content for printing (e.g., a file, text, etc.), print options according to which the content should be printed, etc.

The connection capabilities attribute may indicate a type of connection that may be utilized by the requester device 310. As described above, example types of connections may include connectivity via an access point, TDLS, or peer-to-peer. In one embodiment, the requester device 310 may indicate its connection capabilities by setting certain bits in a frame segment of the session request frames 309a and 309b. In one example, the requester device 310 may set bit 4 to 1 to indicate a preference for communication via the access point infrastructure link, or it may set bit 5 to 1 to indicate a preference for communication via TDLS. The requester device 310 may set either bit 4 or 5 to 0 to indicate that it does not prefer to communicate via the access point infrastructure or via TDLS, respectively. The requester device 310 may further indicate a preference for communication via peer-to-peer by setting both bits 4 and 5 to 0. Various other settings may exist in other examples.

In the present example, the requester device 310 may set bit 4 to 1 in the session request frame 309a to indicate that access point infrastructure is preferred with the service device 350, for example, via the access point 370 which is both shared by the requester device 310 and the service device 350. The requester device 310 may set bits 4 and 5 to 0, however, in the session request frame 309b sent to the service device 360. Peer-to-peer communication may be preferred for such communication since the requester device 310 and the service device 360 are not connected to the same access point. The present example is for purposes of illustration and is not meant to be limiting. Numerous other examples in which different bits are set to indicate a preference for different types of communication may exist.

The session response frames 311a and 311b may also include various attributes, such as a service information attribute and a connection capabilities attribute. As shown in FIG. 3, such information may be received by the requester device 310 from the service device 350 and the service device 360. The service information received from the service devices 350 and 360 may include status information associated with a requested service, a confirmation associated with one or more requested options or capabilities, etc.

The connection capabilities attribute in the session response frames 311a and 311b may be based on a determination by the service devices 350 and 360, respectively, of which type of connection to use for the service. The service devices 350 and 360 may make such a determination (e.g., via the service connection determination module 268 in FIG. 2) based on one or more of a particular service requested, an approximate size of content or information associated with the service, network latency, reported trouble incidents, other indications of the performance of a communication between devices over a network. The service devices 350 and 360 may also make the determination based on their connection capabilities. A service device 350 having connection capabilities implemented by a single wireless interface that is currently connected to the access point 370 may not, for example, establish a peer-to-peer connection with the requester device 310. The service device 350 may, however, establish a connection with the service device 310 via the access point infrastructure 370 upon determining that the service device 350 and the requester device 310 are connected to the same access point 370. The determination may be made based at least in part on access point information in the probe request 301a, in one embodiment.

A service device 350 having connection capabilities implemented by multiple wireless interfaces may establish one or more types of connections. According to one example, the service device 350 may determine a preferred connection type based at least in part on which bits are set in the connection capabilities attribute by the requester device 310. The service device 350 may consider such a preference along with its connection capabilities, performance indications as described above, and other information in determining a type of connection to use for the service. The service device 360 may perform the same or similar functions, in one embodiment.

As shown in FIG. 3, the service device 350 may determine to use the access point infrastructure 370 for facilitating a session with the service device 310 (as shown in communication 311a), the TDLS connection 311b, or the peer-to-peer connection 311c. The determined connection may be indicated in a connection capabilities attribute in the session response frame 311a, 311b, or 311c. A session information attribute including information associated with performing the requested service, as described above, may also be included in the session response frames 311a, 311b, and 311c. Similarly, the session response frame 311d received from the service device 360 may indicate a type of connection determined by the service device 360 (e.g., peer-to-peer) and a session information attribute, among other information.

The above examples are for purposes of illustration and are not meant to be limiting. For example, a different number of each device, types of services, types of communications, etc., may exist in other examples.

Figure 4:
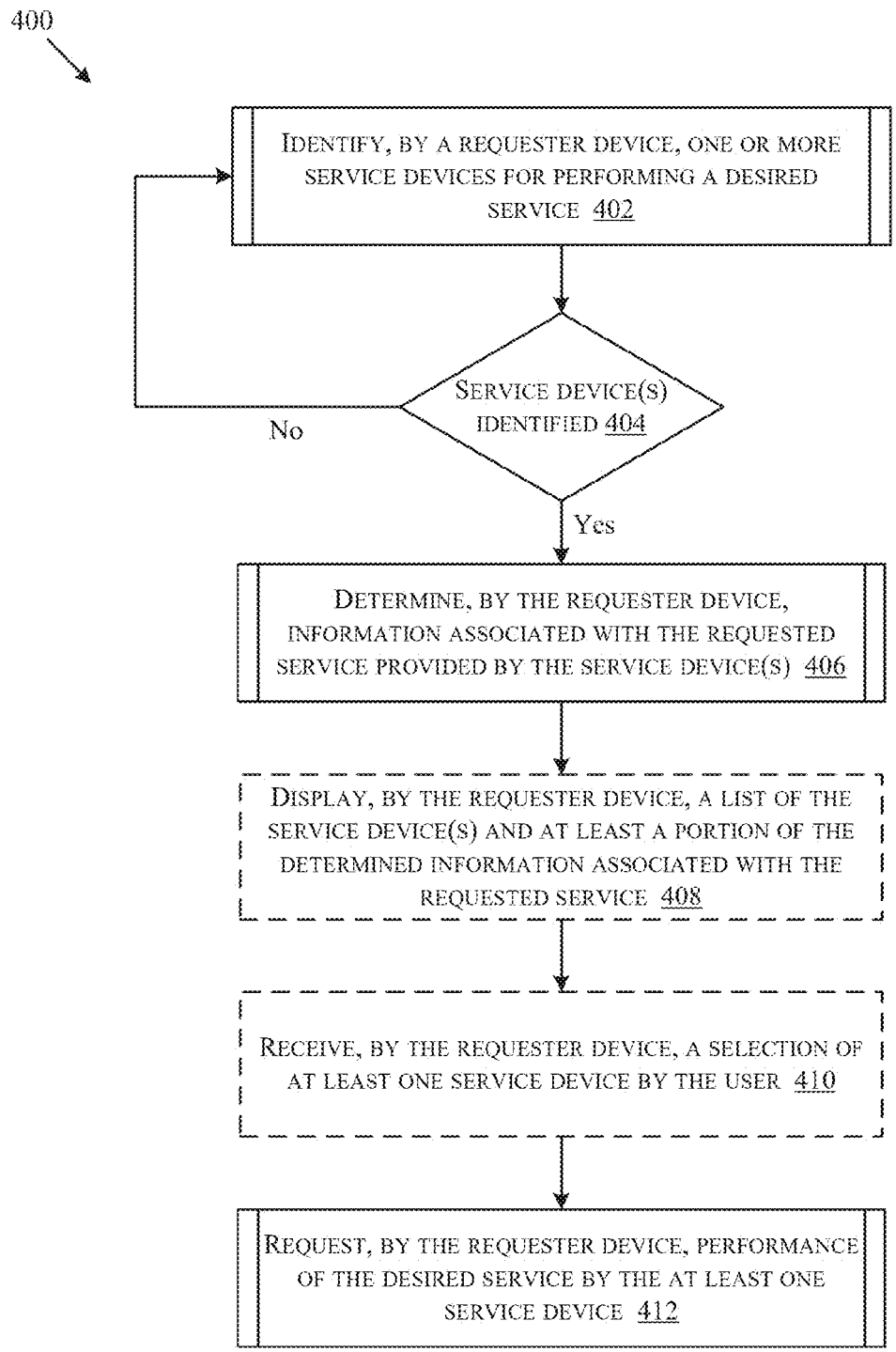
FIG. 4 illustrates a flow diagram of an example process for extending service interoperability functionality to communication between WiFi Direct devices connected to an AP infrastructure, according to an embodiment of the disclosure.
Figure 5:
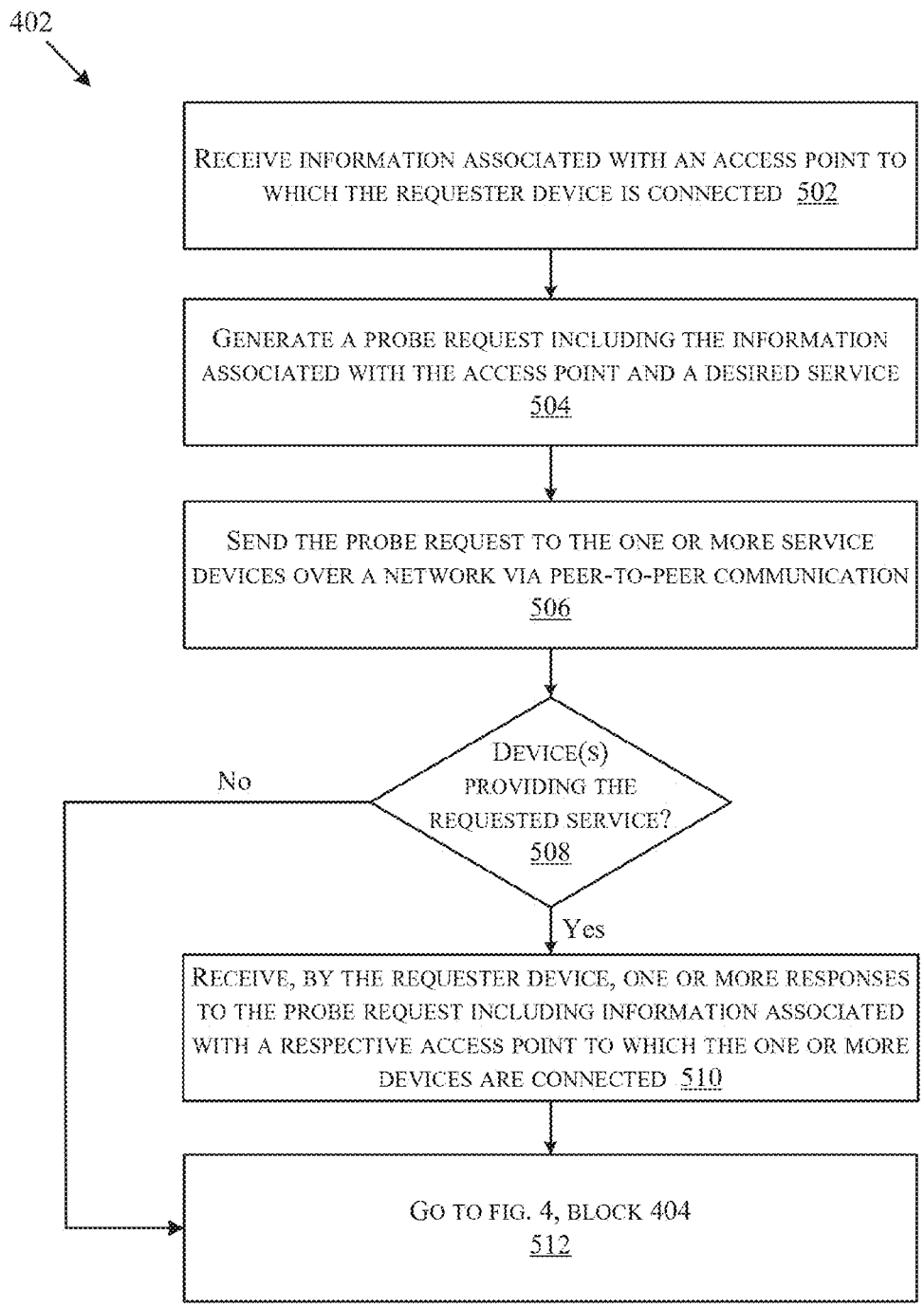
FIG. 5 illustrates a flow diagram of an example process for identifying devices for performing a particular service, according to an embodiment of the disclosure.

FIG. 4 depicts a flow diagram of an example process for extending service interoperability functionality to communication between WiFi Direct devices connected to an AP infrastructure, according to an embodiment of the disclosure. In one embodiment, the example process may be performed at least in part by the requester device 110 in FIG. 1 and the service device 150 in FIG. 1. The example process may begin at block 402, where one or more service devices for performing a desired service may be identified (e.g., by the frame generation module 234). Such identification may be performed in accordance with the processes shown in FIG. 5, in one embodiment. For example, information associated with an access point to which the requester device is connected may be received at block 502. Such information may include a BSSID, among other information, which may be used to determine whether the requester device 310 is connected to the same access point as a service device.

A probe request that includes the information associated with the access point to which the requester device is connected may be generated (e.g., by the frame generation module 234), at block 504. The probe request may be sent to the one or more service devices over a network using the peer-to-peer protocol (e.g., via the communication module 232), at block 506, in one embodiment.

If one or more devices are identified that provide the requested service, at block 508, then one or more probe responses to the probe requests may be received from the one or more service devices (e.g., via the communication module 232), at block 510. The probe response may include information associated with an access point to which the one or more service devices is connected. At block 512, processing may return to decision block 404 in FIG. 4.

Returning to FIG. 4, if a service device providing the requested service is not identified, then processing may return to block 402, where one or more service devices for performing a desired service may be identified. If at least one service device is identified, then information associated with the requested service (service information) provided by the at least one service device may be determined at block 406.

Figure 6:
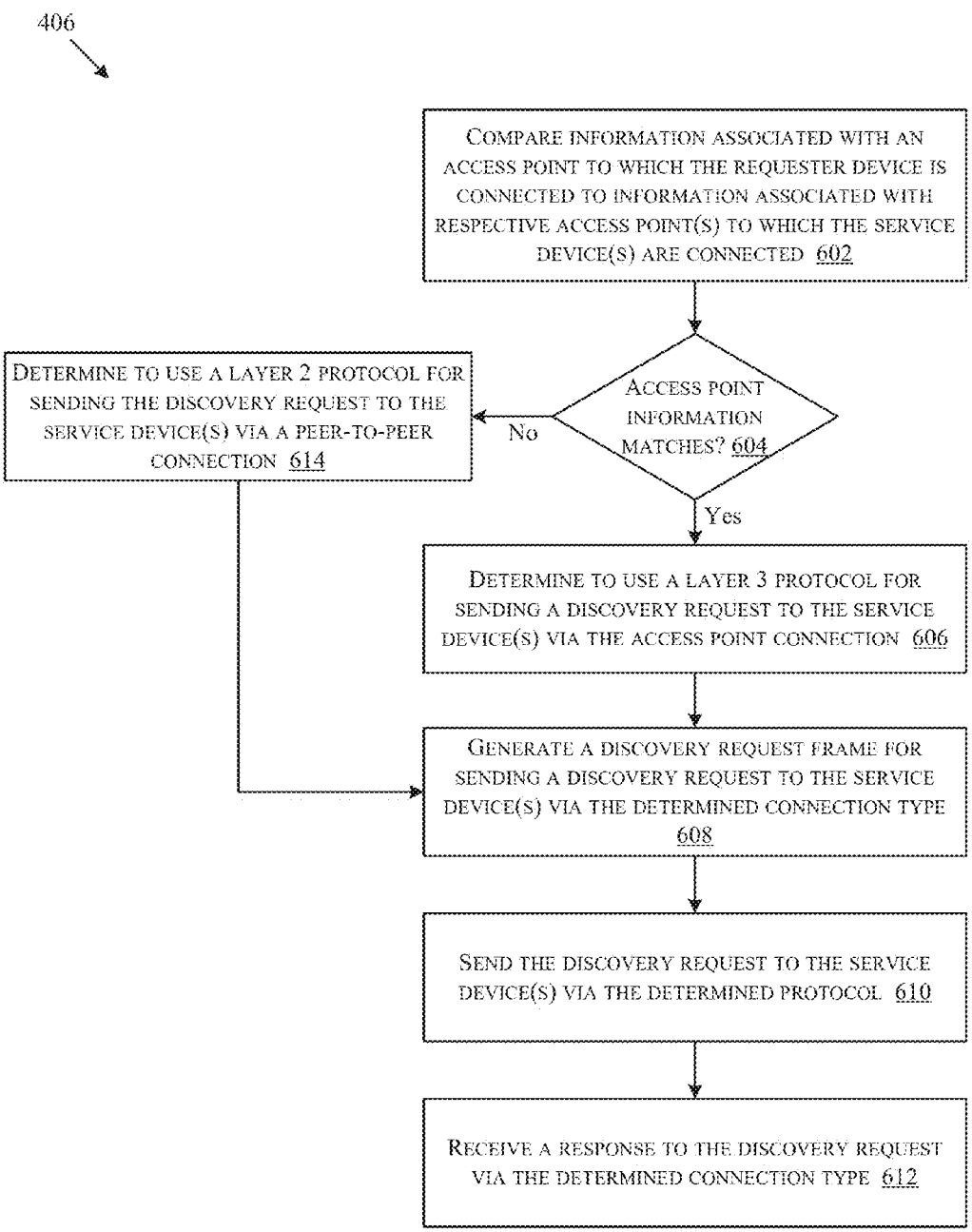
FIG. 6 illustrates a flow diagram of an example process for identifying information associated with a requested service, according to an embodiment of the disclosure.

The determination of the service information may be performed in accordance with FIG. 6, in one embodiment. For example, at block 602, information associated with an access point to which the requester device is connected may be compared to information associated with an access point to which the service device(s) are connected (e.g., via the connection determination module 236). If the information matches, at block 604, then a layer 3 protocol may be determined for use in sending a discovery request to the service device(s) via the access point connection, at block 606. Non-limiting examples of layer 3 protocols may include Bonjour and UPnP. If the access point information does not match, then a layer 2 protocol may be determined for use in sending the discovery request to the service device(s) via a peer-to-peer connection, at block 614.

At block 608, a discovery request frame may be generated for sending a discovery request to the service device(s) via the determined connection type (e.g., via the frame generation module 234). The discovery request frame may be sent to the service device(s) using the determined protocol at block 610. A response to the discovery request may be received via the determined connection type at block 612. The response may include information associated with settings, configurations, capabilities, etc., of the service device(s), in one embodiment.

Returning to FIG. 4, a list of the service device(s) and at least a portion of the determined information associated with the requested service may be displayed at block 408. A selection of at least one service device may be received, for example, by a user viewing the displayed information at block 410.

Figure 7:
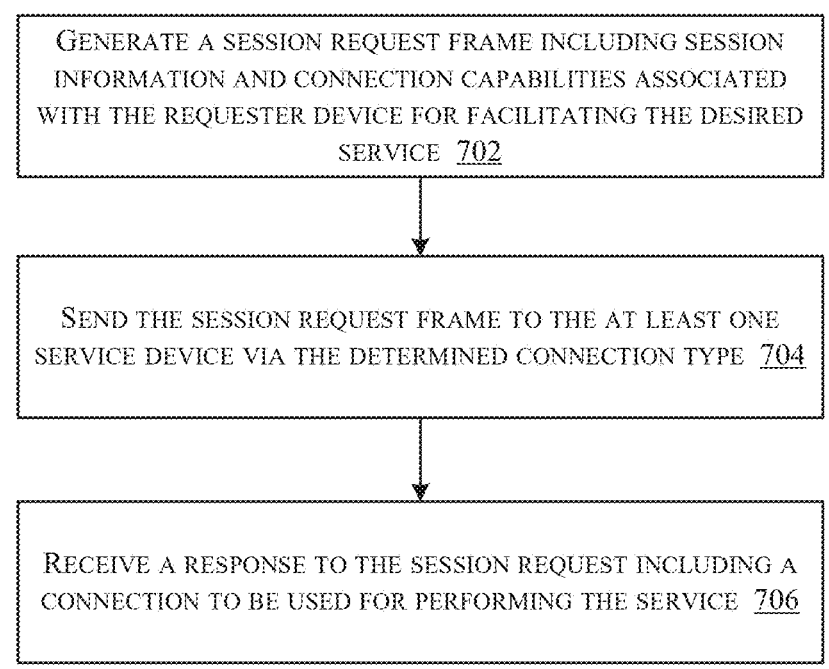
FIG. 7 illustrates a flow diagram of an example process for requesting performance of a service by a service device, according to an embodiment of the disclosure.

At block 412, performance of the desired service by the service device(s) may be requested. Such a request may be performed in accordance with FIG. 7, in one embodiment. For example, a session request frame may be generated at block 702. The session request frame may include session information and connection capabilities associated with the requester device for facilitating the desired service. As described above, setting certain bits in the session request frame (e.g., by the frame generation module 234) may indicate a particular type of connection desired by the requester device 110. The session request frame may be sent to the service device(s) via the determined connection type at block 704, and a response may be received at block 706. The response may include an indication of the type of connection that will be used to perform the service, in one embodiment. Such a determination may be performed by the service device (e.g., via the service connection determination module 268), as described above.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

In an example embodiment, there is disclosed a device that comprises one or more radios and one or more antennas. The device may also include at least one memory that stores computer-executable instructions, and at least one processor configured to access the at least one memory, wherein the at least one processor is configured to execute the computer-executable instructions to generate a probe request comprising a request for a service and first information associated with a first wireless access point to which the device is connected on a wireless fidelity (WiFi) network. The at least one processor may also be configured to send the probe request to one or more service devices within range of the device and receive a respective response to the probe request comprising an identification of the requested service and second information associated with a second wireless access point to which the one or more service devices are connected on the WiFi network. The probe request may be sent via the peer-to-peer protocol, and the probe response may be received via the peer-to-peer protocol, in one embodiment. The device and the one or more service devices may be connected to a WiFi network and each of the devices may be configured to communicate with one another using a WiFi Direct protocol.

The at least one processor may be further configured to determine a type of connection for a subsequent communication with the one or more service devices based at least in part on a comparison of at least a portion of the first information to at least a portion of the second information. The comparison may include comparing a first BSSID in the first information to a second BSSID in the second information. When the first BSSID matches the second BSSID, the at least one processor may be configured to send the subsequent communication to the one or more service devices via at least one of the first wireless access point or a Tunneled Direct Link Setup (TDLS) link.

The at least one processor may be further configured to invoke one or more application programming interface (API) modules associated with the WiFi Direct protocol that provide interoperability between the requested service and a software application stored in the at least one memory that requests the service. In one embodiment, providing interoperability comprises communicating information between the software application and the requested service via the determined type of connection.

In another example embodiment, the at least one processor of the device may be configured to generate a session frame comprising information associated with the requested service and one or more first connection capabilities of the device, the one or more first connection capabilities comprising an indication of the determined type of connection. The at least one processor may be further configured to send the session frame to the one or more service devices and receive, from the one or more services devices, a respective response to the session frame comprising an indication of a different type of connection to be used for performing the service.

In another example embodiment, the at least one processor of the device may be further configured to determine that the first BSSID matches the second BSSID and send a discovery request comprising a request for information associated with the service to the one or more service devices using the Bonjour protocol or the Universal Plug and Play (UPnP) protocol.

In another example embodiment, the at least one processor of the device may be further configured to determine that the first BSSID does not match the second BSSID and send a discovery request comprising a request for information associated with the service to the one or more service devices using the peer-to-peer protocol.

In another example embodiment, there is disclosed one or more computer-readable media storing computer-executable instructions that, when executed by at least one processor, configure the at least one processor to perform various operations. The operations may include generating a probe request comprising a request for a service and first information associated with a first wireless access point to which the device is connected on a wireless fidelity (WiFi) network. The operations may also include sending the probe request to one or more service devices within range of the device and receive a respective response to the probe request comprising an identification of the requested service and second information associated with a second wireless access point to which the one or more service devices are connected on the WiFi network. The probe request may be sent via the peer-to-peer protocol, and the probe response may be received via the peer-to-peer protocol, in one embodiment. The device and the one or more service devices may be connected to a WiFi network and each of the devices may be configured to communicate with one another using a WiFi Direct protocol.

The operations may further include determining a type of connection for a subsequent communication with the one or more service devices based at least in part on a comparison of at least a portion of the first information to at least a portion of the second information. The comparison may include comparing a first BSSID in the first information to a second BSSID in the second information. When the first BSSID matches the second BSSID, the at least one processor may be configured to perform the operation comprising sending the subsequent communication to the one or more service devices via at least one of the first wireless access point or a Tunneled Direct Link Setup (TDLS) link.

The operations may further include invoking one or more application programming interface (API) modules associated with the WiFi Direct protocol that provide interoperability between the requested service and a software application stored in the at least one memory that requests the service. In one embodiment, providing interoperability comprises communicating information between the software application and the requested service via the determined type of connection.

In another example embodiment, the operations may also include generating a session frame comprising information associated with the requested service and one or more first connection capabilities of the device, the one or more first connection capabilities comprising an indication of the determined type of connection. The operations may further include sending the session frame to the one or more service devices and receiving, from the one or more services devices, a respective response to the session frame comprising an indication of a different type of connection to be used for performing the service.

In another example embodiment, the operations may further include determining that the first BSSID matches the second BSSID, and sending a discovery request comprising a request for information associated with the service to the one or more service devices using the Bonjour protocol or the Universal Plug and Play (UPnP) protocol.

In another example embodiment, the operations may include determining that the first BSSID does not match the second BSSID and send a discovery request comprising a request for information associated with the service to the one or more service devices using the peer-to-peer protocol.

In another example embodiment, there is disclosed an apparatus for enabling service interoperability. The apparatus may include one or more radios and one or more antennas. The apparatus may also include means for generating a probe request comprising a request for a service and first information associated with a first wireless access point to which the device is connected on a wireless fidelity (WiFi) network. The apparatus may also include means for sending the probe request to one or more service devices within range of the device and receive a respective response to the probe request comprising an identification of the requested service and second information associated with a second wireless access point to which the one or more service devices are connected on the WiFi network. The probe request may be sent via the peer-to-peer protocol, and the probe response may be received via the peer-to-peer protocol, in one embodiment. The apparatus and the one or more service devices may be connected to a WiFi network and each of the devices may be configured to communicate with one another using the WiFi Direct protocol.

The apparatus may also include means for determining a type of connection for a subsequent communication with the one or more service devices based at least in part on a comparison of at least a portion of the first information to at least a portion of the second information. The comparison may include comparing a first BSSID in the first information to a second BSSID in the second information. When the first BSSID matches the second BSSID, the apparatus may further include means for sending the subsequent communication to the one or more service devices via at least one of the first wireless access point or a Tunneled Direct Link Setup (TDLS) link.

The apparatus may further include means for invoking one or more application programming interface (API) modules associated with a WiFi Direct protocol that provide interoperability between the requested service and a software application stored in the at least one memory that requests the service. In one embodiment, providing interoperability may include means for communicating information between the software application and the requested service via the determined type of connection.

In another example embodiment, the apparatus may further include means for generating a session frame comprising information associated with the requested service and one or more first connection capabilities of the device, the one or more first connection capabilities comprising an indication of the determined type of connection. The apparatus may further include means for sending the session frame to the one or more service devices and means for receiving, from the one or more services devices, a respective response to the session frame comprising an indication of a different type of connection to be used for performing the service.

In another example embodiment, the apparatus may further include means for determining that the first BSSID matches the second BSSID, and means for sending a discovery request comprising a request for information associated with the service to the one or more service devices using the Bonjour protocol or the Universal Plug and Play (UPnP) protocol.

In another example embodiment, the apparatus may further include means for determining that the first BSSID does not match the second BSSID, and means for sending a discovery request comprising a request for information associated with the service to the one or more service devices using the peer-to-peer protocol.

In another example embodiment, there is disclosed a method. The method includes determining, by a service device, one or more first connection capabilities. At least one of the first connection capabilities may be based at least in part on an access point to which the service device is connected on a wireless fidelity (WiFi) network. The method also includes receiving, by the service device from a requester device, an indication of one or more second connection capabilities of the requester device and a request for the service device to perform a service. The method further includes determining, by the service device, a type of connection for performing the service for the requester device, and sending, by the service device, information associated with performing the service to the requester device using the determined type of connection. The determined type of connection may include at least one of the first access point, a Tunneled Direct Link Setup (TDLS) link, or a peer-to-peer connection, in certain embodiments.

In another example embodiment, the method may also include receiving, by the service device from a software application of the requester device, a request to perform the service, wherein interoperability between the software application and the service is provided by an application programming interface (API) module associated with a WiFi Direct protocol.

In another example embodiment, the access point may include a first access point, and the method may also include receiving, by the service device, a probe request comprising an identification of a second access point to which the requester device is connected on the WiFi network, wherein the probe request is received via the peer-to-peer protocol. The method may further include generating, by the service device, a probe response comprising the first access point and sending, by the service device, the probe response to the requester device via the peer-to-peer protocol.

In another example embodiment, there is disclosed a system for enabling service interoperability. The system may include one or more radios and one or more antennas. The system may also include at least one memory that stores computer-executable instructions and at least one processor configured to access the at least one memory, wherein the at least one processor is configured to execute the computer-executable instructions to determine one or more first connection capabilities. At least one of the first connection capabilities may be based at least in part on an access point to which the service device is connected on a wireless fidelity (WiFi) network. The at least one processor may also be configured to receive, from a requester device, an indication of one or more second connection capabilities of the requester device and a request for the service device to perform a service. The at least one processor may be further configured to determine a type of connection for performing the service for the requester device, and send information associated with performing the service to the requester device using the determined type of connection. The determined type of connection may include at least one of the first access point, a Tunneled Direct Link Setup (TDLS) link, or a peer-to-peer connection, in certain embodiments.

In another example embodiment, the at least one processor may also be configured to receive, from a software application of the requester device, a request to perform the service, wherein interoperability between the software application and the service may be provided by an application programming interface (API) module associated with a WiFi Direct protocol.

In another example embodiment, the access point may include a first access point, and the at least one processor may be further configured to receive a probe request comprising an identification of a second access point to which the requester device is connected on the WiFi network, wherein the probe request is received via the peer-to-peer protocol. The at least one processor may be further configured to generate a probe response comprising the first access point, and send the probe response to the requester device via the peer-to-peer protocol.

In another example embodiment, there is disclosed a device for enabling service interoperability. The device may include one or more radios and one or more antennas. The device may also include means for determining one or more first connection capabilities. At least one of the first connection capabilities may be based at least in part on an access point to which the service device is connected on a wireless fidelity (WiFi) network. The device may further include means for receiving, from a requester device, an indication of one or more second connection capabilities of the requester device and a request for the service device to perform a service. The device may further include means for determining a type of connection for performing the service for the requester device, and means for sending information associated with performing the service to the requester device using the determined type of connection. The determined type of connection may include at least one of the first access point, a Tunneled Direct Link Setup (TDLS) link, or a peer-to-peer connection, in certain embodiments.

In another example embodiment, the device may include means for receiving, from a software application of the requester device, a request to perform the service, wherein interoperability between the software application and the service may be provided by an application programming interface (API) module associated with a WiFi Direct protocol.

In another example embodiment, the access point may include a first access point, and the device may further include means for receiving a probe request comprising an identification of a second access point to which the requester device is connected on the WiFi network, wherein the probe request is received via the peer-to-peer protocol. The device may further include means for generating a probe response comprising the first access point, and means for sending the probe response to the requester device via the peer-to-peer protocol.

In another example embodiment, there is disclosed one or more computer-readable media storing computer-executable instructions that, when executed by at least one processor, configure the at least one processor to perform various operations. The operations may include determining one or more first connection capabilities. At least one of the first connection capabilities may be based at least in part on an access point to which the service device is connected on a wireless fidelity (WiFi) network. The operations may also include receiving, from a requester device, an indication of one or more second connection capabilities of the requester device and a request for the service device to perform a service. The operations may further include determining a type of connection for performing the service for the requester device, and sending, by the service device, information associated with performing the service to the requester device using the determined type of connection. The determined type of connection may include at least one of the first access point, a Tunneled Direct Link Setup (TDLS) link, or a peer-to-peer connection, in certain embodiments.

In another example embodiment, the operations may also include receiving, from a software application of the requester device, a request to perform the service, wherein interoperability between the software application and the service is provided by an application programming interface (API) module associated with a WiFi Direct protocol.

In another example embodiment, the access point may include a first access point, and the operations may also include receiving a probe request comprising an identification of a second access point to which the requester device is connected on the WiFi network, wherein the probe request is received via the peer-to-peer protocol. The operations may further include generating a probe response comprising the first access point and sending the probe response to the requester device via the peer-to-peer protocol.

What is claimed is:

1. A device comprising:
   one or more radios;
   one or more antennas;
   at least one memory that stores computer-executable instructions; and
   at least one processor configured to access the at least one memory, wherein the at least one processor is configured to execute the computer-executable instructions to:
      generate a probe request comprising a request for a service and first information associated with a first wireless access point to which the device is connected on a wireless fidelity (WiFi) network;
      send the probe request to one or more service devices within range of the device;
      receive a respective response to the probe request comprising an identification of the requested service and second information associated with a second wireless access point to which the one or more service devices are connected on the WiFi network;
      generate a session frame comprising information associated with the requested service and one or more first connection capabilities of the device;
      determine a first bit and a second bit included in the session frame and associated with the one or more first connection capabilities;
      determine a type of connection for a subsequent communication with the one or more service devices based at least in part on the first bit and the second bit, wherein the type of connection is an access point connection when the first bit is set to a first value and the second bit is set to a second value, the first value being different from the second value, wherein the type of connection is a Tunneled Direct Link Setup (TDLS) connection when the second bit is set to the first value and the first bit is set to the second value, and wherein the type of connection is a peer-to-peer connection when the first bit and the second bit are set to a same value; and
      invoke one or more application programming interface (API) modules associated with a WiFi Direct protocol that provide interoperability between the requested service and a software application stored in the at least one memory that requests the service.

2. The device of claim 1, wherein providing interoperability comprises communicating information between the software application and the requested service via the determined type of connection.

3. The device of claim 1, the at least one processor further configured to execute the computer-executable instructions to:
   send the session frame to the one or more service devices; and
   receive, from the one or more services devices, a respective response to the session frame comprising an indication of a different type of connection to be used for performing the service.

4. The device of claim 1, the at least one processor further configured to execute the computer-executable instructions to:
   determine that a first BSSID of the first wireless access point matches a second BSSID of the second wireless access point; and
   send a discovery request comprising a request for information associated with the service to the one or more service devices using a Bonjour protocol or a Universal Plug and Play (UPnP) protocol.

5. The device of claim 1, the at least one processor further configured to execute the computer-executable instructions to:
   determine that a first BSSID of the first wireless access point does not match a second BSSID of the second wireless access point; and
   send a discovery request comprising a request for information associated with the service to the one or more service devices using the peer-to-peer protocol.

6. The device of claim 1, wherein the probe request is sent via the peer-to-peer protocol, and the probe response is received via the peer-to-peer protocol.

7. The device of claim 1, wherein the device and the one or more service devices are connected to a WiFi network and each of the devices is configured to communicate with one another using the WiFi Direct protocol.

8. One or more non-transitory computer-readable media storing computer-executable instructions that, when executed by at least one processor, configure the at least one processor to perform operations comprising:
   generating a probe request comprising a request for a service and first information associated with a first wireless access point on a wireless fidelity (WiFi) network to which a requester device comprising the least one processor is connected;
   sending the probe request to one or more service devices within range of the requester device;
   receiving a respective response to the probe request comprising an identification of a requested service and second information associated with a second wireless access point to which the one or more service devices are connected on the WiFi network;
   generating a session frame comprising information associated with the requested service and one or more first connection capabilities of the device;
   determining a first bit and a second bit included in the session frame and associated with the one or more first connection capabilities;
   determining a type of connection for a subsequent communication with the one or more service devices based at least in part on the first bit and the second bit, wherein the type of connection is an access point connection when the first bit is set to a first value and the second bit is set to a second value, the first value being different from the second value, wherein the type of connection is a Tunneled Direct Link Setup (TDLS) connection when the second bit is set to the first value and the first bit is set to the second value, and wherein the type of connection is a peer-to-peer connection when the first bit and the second bit are set to a same value; and invoking one or more application programming interface (API) modules associated with a WiFi Direct protocol that provide interoperability between the requested service and a software application stored in the at least one memory that requests the service.

9. The one or more computer-readable media of claim 8, wherein providing interoperability comprises the at least one processor being further configured to execute the computer-executable instructions to perform the operation comprising communicating information between the software application and the requested service via the determined type of connection.

10. The one or more computer-readable media of claim 8, the at least one processor further configured to execute the computer-executable instructions to perform the operations comprising:
sending the session frame to the one or more service devices; and
receiving, from the one or more services devices, a respective response to the session frame comprising an indication of a different type of connection to be used for performing the service.

11. The one or more computer-readable media of claim 8, the at least one processor further configured to execute the computer-executable instructions to perform the operation comprising:
determining that a first BSSID of the first wireless access point matches a second BSSID of the second wireless access point; and
sending a discovery request comprising a request for information associated with the service to the one or more service devices using a Bonjour protocol or a Universal Plug and Play (UPnP) protocol.

12. The one or more computer-readable media of claim 8, the at least one processor further configured to execute the computer-executable instructions to perform the operation comprising:
determining that a first BSSID of the first wireless access point does not match a second BSSID of the second wireless access point; and
sending a discovery request comprising a request for information associated with the service to the one or more service devices using the peer-to-peer protocol.

13. The one or more computer-readable media of claim 8, wherein the probe request is sent via the peer-to-peer protocol and the probe response is received via the peer-to-peer protocol.

14. The one or more computer-readable media of claim 8, wherein the requester device and the one or more service devices are connected to a WiFi network and each of the devices is configured to communicate with one another using the WiFi Direct protocol.

15. A method comprising:
determining, by a service device associated with a first wireless access point, one or more first connection capabilities, wherein at least one of the first connection capabilities is based at least in part on an access point to which the service device is connected on a wireless fidelity (WiFi) network;
receiving, by the service device from a requester device, a session frame comprising an indication of one or more second connection capabilities of the requester device associated with a second wireless access point and a request for the service device to perform a service;
determining, by the service device, a first bit and a second bit included in the session frame;
determining, by the service device, a type of connection for a subsequent communication with the requester device based at least in part on the first bit and the second bit, wherein the type of connection is an access point connection when the first bit is set to a first value and the second bit is set to a second value, the first value being different from the second value, wherein the type of connection is a Tunneled Direct Link Setup (TDLS) connection when the second bit is set to the first value and the first bit is set to the second value, and wherein the type of connection is a peer-to-peer connection when the first bit and the second bit are set to a same value; and
sending, by the service device, information associated with performing the service to the requester device using the determined type of connection.

16. The method of claim 15, wherein the determined type of connection comprises at least one of the access point, a Tunneled Direct Link Setup (TDLS) link, or a peer-to-peer connection.

17. The method of claim 15, further comprising receiving, by the service device from a software application of the requester device, a request to perform the service, wherein interoperability between the software application and the service is provided by an application programming interface (API) module associated with a WiFi Direct protocol.

18. The method of claim 15, wherein the access point comprises a first access point, the further comprising:
receiving, by the service device, a probe request comprising an identification of a second access point to which the requester device is connected on the WiFi network, wherein the probe request is received via the peer-to-peer protocol; and
generating, by the service device, a probe response comprising the first access point; and
sending, by the service device, the probe response to the requester device via the peer-to-peer protocol.

* * * * *